(12) United States Patent
Mulvey

(10) Patent No.: US 8,425,151 B2
(45) Date of Patent: Apr. 23, 2013

(54) SOIL REMEDIATION

(75) Inventor: Philip James Mulvey, Willoughby (AU)

(73) Assignee: Environmental & Earth Sciences International Pty Ltd, Waverton, New South Wales (AU)

( * ) Notice: Subject to any disclaimer, the term of this patent is extended or adjusted under 35 U.S.C. 154(b) by 806 days.

(21) Appl. No.: 12/374,312

(22) PCT Filed: Jul. 19, 2007

(86) PCT No.: PCT/AU2007/000997
§ 371 (c)(1),
(2), (4) Date: Oct. 15, 2009

(87) PCT Pub. No.: WO2008/009051
PCT Pub. Date: Jan. 24, 2008

(65) Prior Publication Data
US 2010/0028083 A1 Feb. 4, 2010

(30) Foreign Application Priority Data

Jul. 19, 2006 (AU) .............................. 2006903887
Jul. 25, 2006 (AU) .............................. 2006903999

(51) Int. Cl.
*B09C 1/08* (2006.01)
*B09C 1/10* (2006.01)
(52) U.S. Cl.
USPC ............... 405/128.75; 405/128.5; 134/25.1

(58) Field of Classification Search ............... 405/128.1, 405/128.15, 128.45, 128.5, 128.7, 128.75; 134/25.1
See application file for complete search history.

(56) References Cited

U.S. PATENT DOCUMENTS

| 4,336,136 | A  | * | 6/1982  | Giguere ...................... 210/178 |
|-----------|----|---|---------|----------------------------------------|
| 4,801,384 | A  | * | 1/1989  | Steiner ....................... 210/634 |
| 5,039,415 | A  | * | 8/1991  | Smith ......................... 210/611 |
| 5,055,196 | A  | * | 10/1991 | Darian et al. ................ 210/638 |
| 5,149,444 | A  | * | 9/1992  | Hoch ......................... 405/128.8 |
| 5,154,831 | A  | * | 10/1992 | Darian et al. ................ 210/639 |
| 5,286,386 | A  | * | 2/1994  | Darian et al. ................ 210/639 |
| 5,563,066 | A  | * | 10/1996 | Buchanan .................... 435/264 |
| 5,622,864 | A  | * | 4/1997  | Buchanan ................... 435/290.1 |
| 7,431,849 | B1 | * | 10/2008 | Swearingen et al. ......... 210/749 |
| 7,909,989 | B2 | * | 3/2011  | Duyvesteyn et al. ......... 208/390 |

FOREIGN PATENT DOCUMENTS

| CA | 2327443      | 5/2002 |
|----|--------------|--------|
| WO | WO 90/06795  | 6/1990 |
| WO | WO 98/20234  | 5/1998 |

* cited by examiner

*Primary Examiner* — Tara M. Pinnock
(74) *Attorney, Agent, or Firm* — Miles & Stockbridge P.C.

(57) ABSTRACT

The present invention relates generally to a method of soil remediation or bioremediation 10 generally comprising the steps of: 1. 12, treating contaminated soil with a chemical surfactant in a primary treatment stage; 2. 14, further treating the soil with an aliphatic or aromatic hydrocarbon; 3. 20, implementing final soil remediation processes where necessary until remediation criteria is achieved. The contaminated soil includes organic contaminants including, among other things, polycyclic aromatic hydrocarbons (PAH).

19 Claims, 5 Drawing Sheets

SOIL REMEDIATION

FIELD OF THE INVENTION

The present invention relates broadly to a method of remediating soil including organic contaminants. The invention relates particularly, although not exclusively, to soil bioremediation and is understood to extend to include remediation of soils, fills, sediments and non-liquid wastes.

BACKGROUND OF THE INVENTION

In the field of soil bioremediation there are three (3) generally recognized techniques. The first is referred to as biopiling and involves stockpiling contaminated soil, covered in plastic and periodically treating it with air and nutrients via pipes placed within the stockpile. The second of these techniques, known as landfarming, involves spreading the soil or leaving it in-situ and after the addition of nutrients tilling the soil at regular intervals. The last of these known techniques involves composting of the contaminated soil by the addition of organic matter where its temperature and/or surrounding humidity is monitored and the composted material is occasionally turned in line with known techniques.

SUMMARY OF THE INVENTION

According to the present invention there is provided a method of remediating soil including organic contaminants, the method comprising the steps of:
 excavating the soil;
 treating the excavated soil with a chemical surfactant;
 stockpiling the soil treated with the chemical surfactant to promote liberation of the organic contaminants from the soil; and
 recovering or providing soil having a relatively low concentration of the organic contaminants.

Preferably the method of remediating soil also comprises the step of further treating the liberated soil with an aliphatic or aromatic hydrocarbon to degrade bonds between the soil and at least some of the remaining organic contaminants to separate said organic contaminants from the soil.

It is to be understood that the soil in having a relatively low concentration of the separated organic contaminants is considered fit for use.

The step of treating the soil with an aliphatic hydrocarbon preferably includes controlled treatment with a hydrocarbon distillate or a derivative or mixture thereof with the range seven to twenty carbon atoms, such as kerosene.

The method of remediating soil preferably also comprises the step of treating the surfactant treated soil with an alcohol which is effective in increasing the void space of the soil. This can be added to the soil before, during or after the further treatment with the aliphatic or aromatic hydrocarbon.

Preferably the step of treating the soil with a chemical surfactant involves controlled treatment with natural oils and/or terpenes. More preferably this controlled treatment is effective in degrading the bond between some of the organic contaminants and the soil. Even more preferably this degradation of the bonds is effective in liberating the organic contaminants and solubilising aquaphobic organic contaminants.

The step of stockpiling the soil treated with the chemical surfactant preferably includes a period of between about 1 to about 7 days for gradual miscibilization of the organic contaminants. More preferably this stockpiling step includes the step of adding organic matter, manure, nutrients and/or soil ameliorants before or after treatment with the chemical surfactant.

The method of remediating soil preferably further comprises the step of secondary stockpiling of the soil after treatment with the chemical surfactant in the primary stockpiling step. This secondary stockpiling step preferably includes a period of several weeks to several months for gradual degradation of surfactant-liberated organic contaminants from the soil. This period of secondary stockpiling preferably further includes the step of turning the stockpile approximately every 1 to 6 weeks for aeration and/or homogenization. More preferably the step of turning the stockpile includes the step of adjusting the level of nutrients and moisture for microbial growth.

The method preferably still further comprises the step of stockpiling the soil after the further treatment step with the aliphatic or aromatic hydrocarbon. This stockpiling step preferably occurs after resting the soil for a limited period following the step of treating the soil with the chemical surfactant. This stockpiling step preferably includes a period of between about 2 to about 6 weeks for gradual degradation of aliphatic hydrocarbon-liberated organic contaminants from the soil. This period of stockpiling preferably further comprises the step of turning the stockpile approximately every 1 to 4 weeks for aeration and/or homogenization. More preferably the level of nutrients and moisture is adjusted for microbial growth during the step of stockpile turning.

The steps of stockpiling the soil preferably include the step of separating the soil into two or more separate stockpiles.

BRIEF DESCRIPTION OF THE FIGURES

A preferred embodiment of the present invention will now be described, by way of example only, with reference to the following drawings.

DETAILED DESCRIPTION OF THE PREFERRED EMBODIMENT

Figure 1:
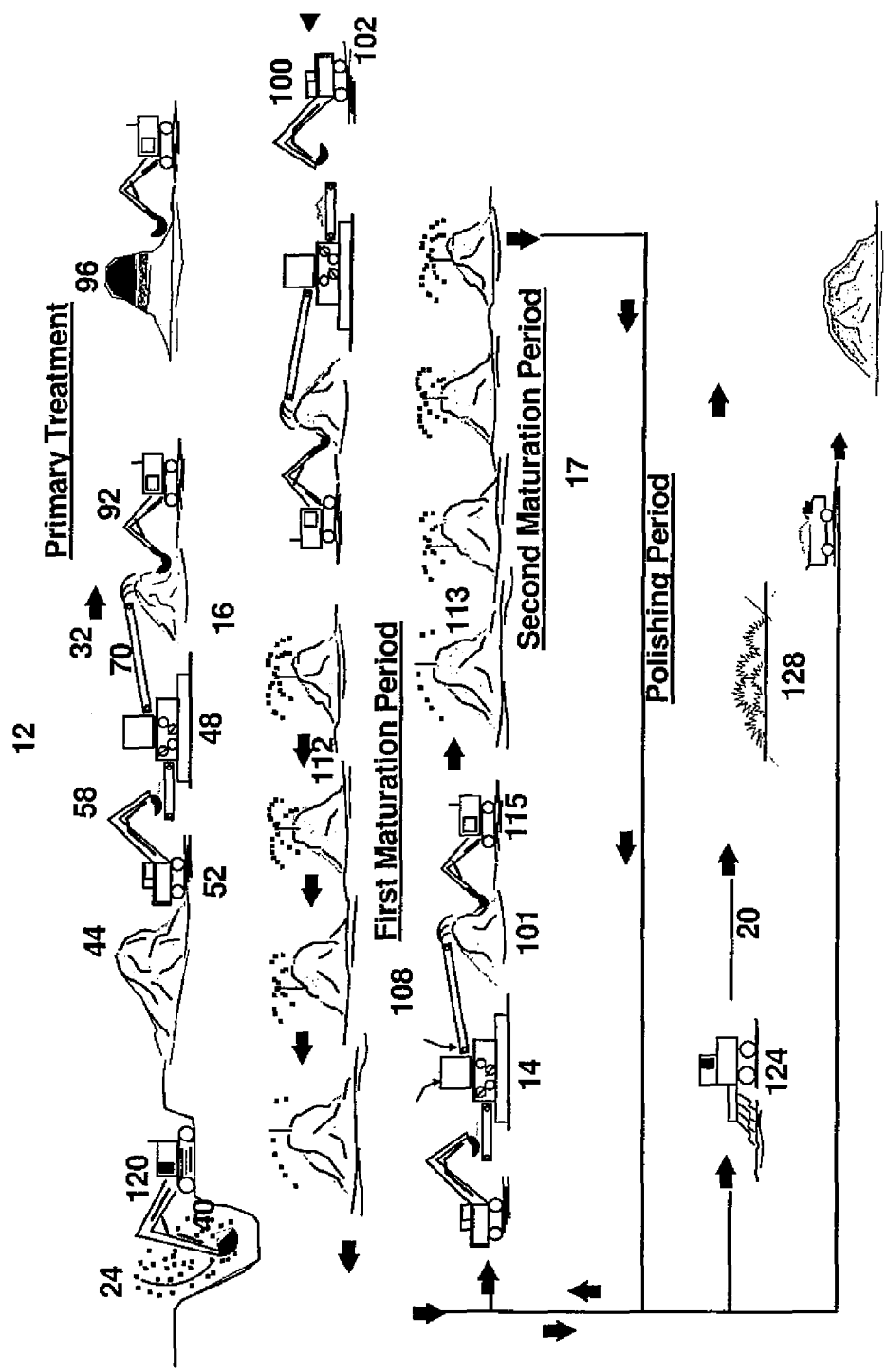
FIG. 1 is a schematic flow diagram showing steps, according to a preferred form of the present invention, for soil bioremediation.

FIG. 1 shows a preferred form of a method of soil remediation according to the present invention in the form of soil bioremediation or as coined by the applicant dynamic biopiles. This soil bioremediation method generally comprises the steps of:

(i) 12, treating contaminated soil with a chemical surfactant in a primary treatment stage;
(ii) 16, stockpiling the treated soil in a first maturation period;
(iii) 14, further treating the soil with an aliphatic or aromatic hydrocarbon;
(iv) 17, stockpiling the treated soil in a second maturation period;
(v) continuing the stockpile based remediation, where necessary until remediation criteria is close to being achieved; and
(vi) 20, implementing final soil remediation processes where necessary until remediation criteria is achieved.

These steps are described in more detail below. The contaminated soil includes organic contaminants including, among other things, polycyclic aromatic hydrocarbons (PAH).

In order to perform step 12 of treating the soil with a surfactant the soil is excavated from the ground as shown in step 24. The excavated soil 40 is then stockpiled into stockpile 44 which may be covered in a biofilter such as straw, if left exposed for a period of time.

Soil from the stockpile 44 is ultimately fed into a mobile unit for soil treatment (MUST) 48 by a loader 52. The soil may be screened prior to loading in the MUST 48. The loader 52 may also be used to remove steel and other objects greater than around 30 cm square. The MUST 48 performs step 12 to treat the soil with a liquid surfactant 32.

Figure 2:
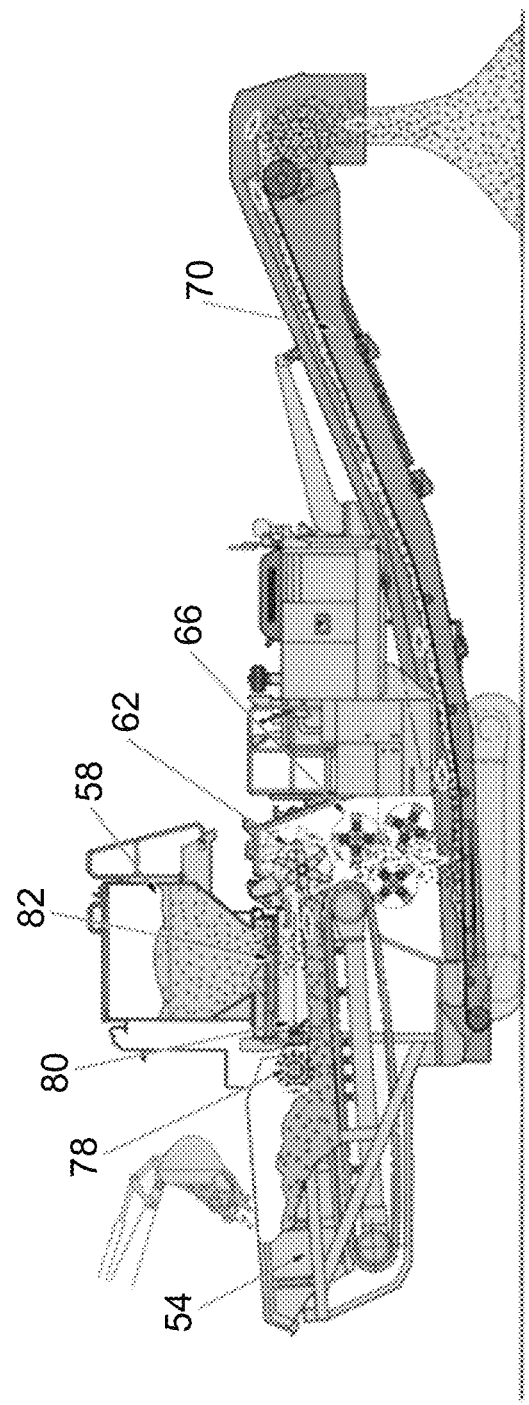
FIG. 2 is a schematic elevational view of one example of a mobile unit for soil treatment (MUST)

Referring to FIG. 2, the MUST 48 generally comprises a raw material hopper 54, a solidifying material hopper 58, a soil cutter 62, a rotary hammer 66, a discharge conveyor belt 70 and an after cutter. The MUST 48 also comprises a scraping rotor 78, a raw material measuring sensor 80 and a solidifying material feeder 82. Nutrients and ameliorants such as fertilizers and gypsum may be added into the solidifying material hopper 58. Referring to FIG. 1, the liquid surfactant 32 is added as the processed soil passes along the discharge conveyor belt 70. The liquid surfactant 32, such as natural oils and terpenes, is effective in liberating the contaminates from the soil, 40, so that they can be biodegraded.

Organic matter such as straw may be added before or after the initial processing in the MUST.

Material discharged from the MUST 48 is moved by a loader 92 into a primary stockpile 96 for curing the discharged material. The stockpile 96 includes in addition to the discharged material, layers of organic matter, manure, nutrients and/or soil ameliorants. Material discharged by the MUST 48 is cured for a period of time ranging from about 1 to about 7 days.

Cured soil 100 may then be loaded by a loader 102 onto a MUST or a vibrating coarse screen which mixes the soil prior to its first maturation period 16. During this secondary stockpiling or first maturation period the soil is turned every 1 to 6 weeks and soil and stockpile conditions monitored. The stockpile may be turned 1 to 6 times for a typical maturation or secondary stockpiling period of several weeks to several months. The soil is reloaded into the MUST which performs step 14 by treating the matured soil 100 with an aliphatic or aromatic hydrocarbon which, in this particular example, comprises a hydrocarbon distillate such as kerosene 108. The soil may also be treated with an alcohol such as ethanol which increases the void space of the soil by swelling of the organic matter.

The hydrocarbon distillate 108 in this second maturation period at least partially separates more tightly held of the organic contaminants of the soil allowing further biodegradation. Separation of the organic contaminants from the soil is facilitated by step 17 which involves further stockpiling of the soil 101 into stockpiles 113. Loader 115 forms the stockpiles 113.

Soil 101 rests for a limited period (say 3 to 5 weeks) before it is stockpiled in the stockpiles 113 for a period of time ranging from about 2 to about 6 weeks. Stockpiles 113 are turned every 1 to 6 weeks during this second maturation period to aerate the soil.

Soil of the stockpiles 113 is also further treated throughout the maturation periods as appropriate. For example, soil may be reprocessed by the MUST 104. Any observable residual contaminant lumps such as tar lumps are returned for reprocessing through the MUST 104. Reprocessed material is then incorporated into the stockpiles 113 or 112 to undergo maturation, or a portion thereof.

During the maturation period(s) the organic contaminants such as PAH and total petroleum hydrocarbons (TPH) are measured along with process parameters such as temperature and moisture. These measurements are assessed against soil remediation criteria. Once the concentrations are approaching those required, soil from the stockpiles 112 or 113 is returned to the site 120 from where it was excavated.

When the addition of liquid bond breakers (surfactants, distillate and/or alcohol) is no longer having any effect the stockpiles are knocked flat. If the remediation criteria have not been achieved a polishing phase involving phytoremediation is necessary. Continued bioremediation is facilitated by tilling 124 with seed and distillate and cropping 128. Cropping 128 comprises, for example, sowing of green fodder or a crop, including rye grass, canola and oats. Following sowing the soil is kept moist. Fertiliser can be added when the soil is tilled During the tilling and cropping steps the soil is routinely tested until the soil remediation criteria is achieved. Degradation of the those remaining organic contaminants, which are difficult to access is achieved by the root exudates and root microbes associated with certain crops and grasses. The soil is then no longer required to be tilled or cropped specifically for remediation purposes and can be returned to the excavation 120.

Figure 3A:
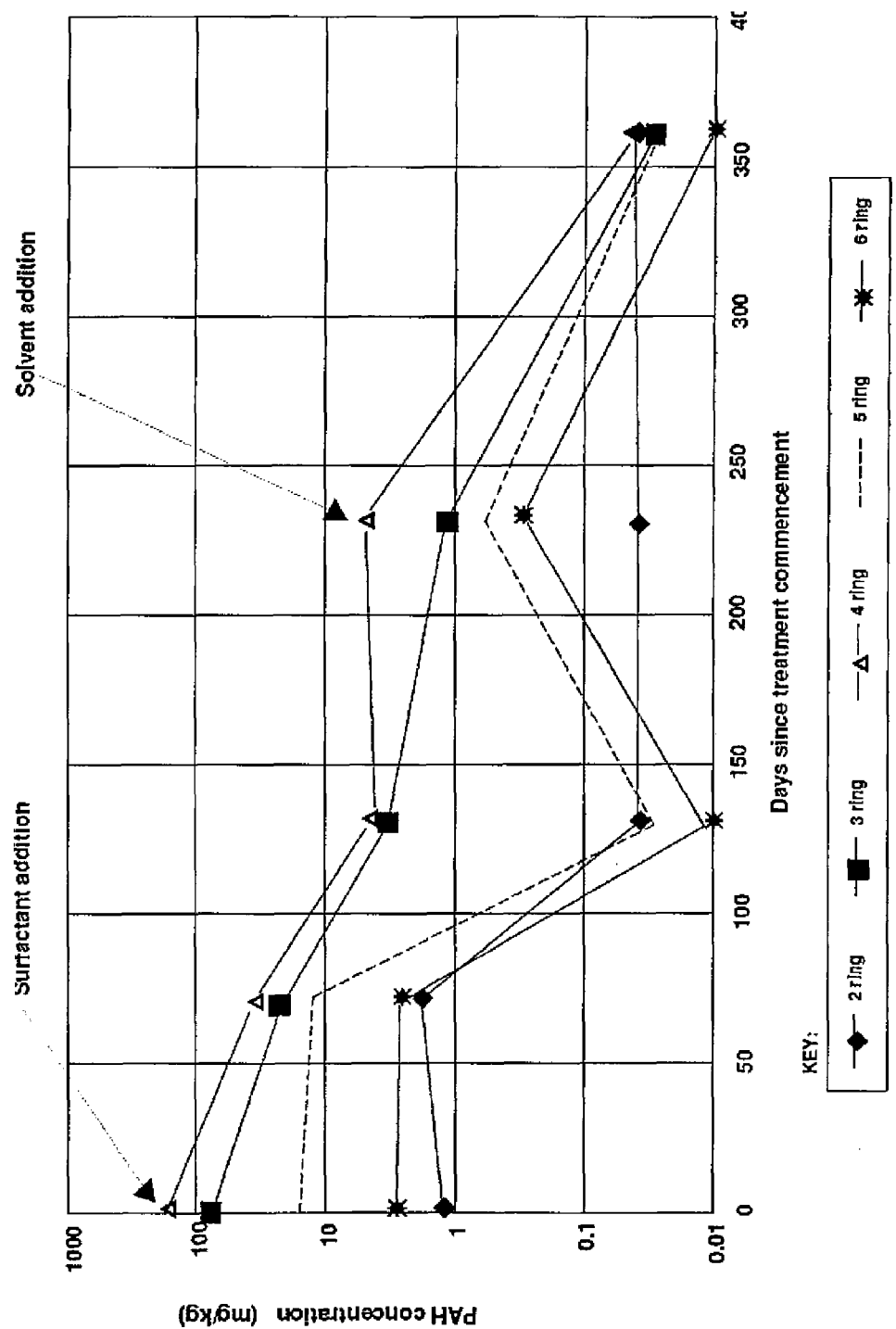
FIGS. 3a to 3c are graphs showing degradation in organic contaminants over time for different contaminated soils treated according to the methodology of FIG. 1.
Figure 3B:
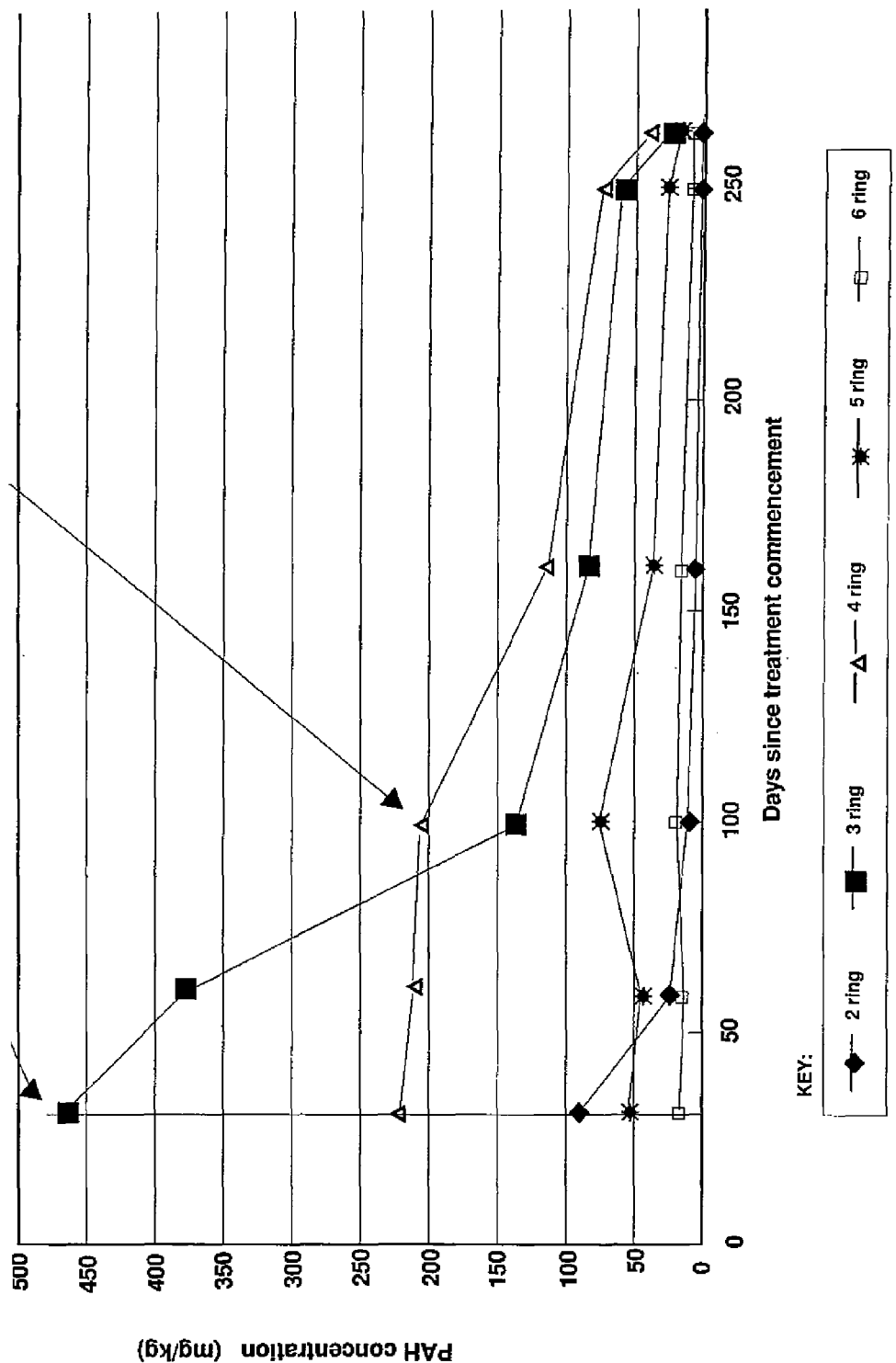
Figure 3C:
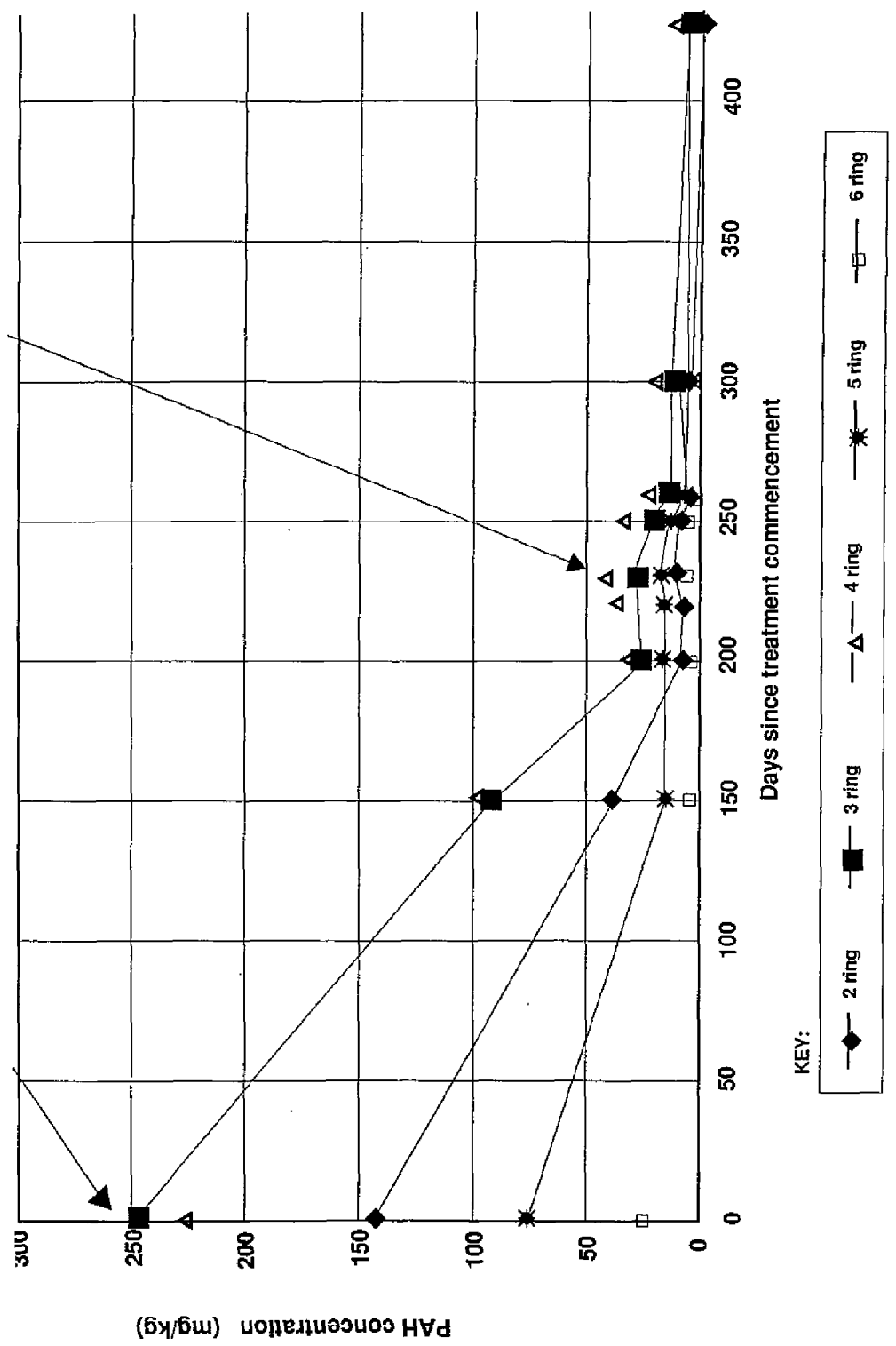

FIGS. 3a to 3c graphically represent different contaminated soils and the degradation of organic contaminants, in this example PAHs of various ring lengths, following treatment with surfactants and solvents in accordance with the preferred methodology of the invention. During this treatment period, it can be clearly seen that the concentrations of PAH reduce with addition of the chemical surfactant, and then reduce further with the addition of the aliphatic or aromatic hydrocarbon in the form of the preferred solvent, and optionally alcohol.

Soil bioremediation such as that depicted in FIG. 1 provides advantages over traditional soil bioremediation techniques including:

(a) improving the rate of remediation;
(b) improving the effectiveness of remediation by decreasing concentrations of PAH; and
(c) enabling soil contaminated with lower bioavailable PAH to be more effectively remediated.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed in Australia or elsewhere before the priority date of each invention of this application.

It will be appreciated by persons skilled in the art that numerous variations and/or modifications may be made to the invention as shown in the specific embodiments without departing from the spirit or scope of the invention as broadly described. For example, the soil bioremediation process can be combined with phytoremediation and/or biosolid amendment. Furthermore, the sequence of steps described in the preferred method of bioremediation may be varied depending on the characteristics of the contaminated soil. The process may also involve repeating one or more of the described steps to provide the requisite characteristics of the remediated soil. The present embodiments are, therefore, to be considered in all respects as illustrative and not restrictive.

The invention claimed is:

1. A method of remediating soil including organic contaminants, the method comprising the steps of:
excavating the soil;
treating the excavated soil with a chemical surfactant;
stockpiling the soil treated with the chemical surfactant to promote liberation of the organic contaminants from the soil to provide liberated soil;
further treating the liberated soil with an aliphatic or aromatic hydrocarbon to degrade bonds between the soil and at least some of the remaining organic contaminants to separate said organic contaminants from the soil; and
recovering or providing soil having a reduced concentration of the organic contaminants.

2. A method as defined in claim 1 wherein the step of further treating the liberated soil with an aliphatic or aromatic hydrocarbon includes controlled treatment of the soil with a hydrocarbon distillate having a molecular structure with ten to twenty carbon atoms or a derivative or mixture thereof.

3. A method as defined in claim 1 wherein the method also comprises the step of treating the surfactant treated soil with an alcohol which is effective in increasing the void space of the soil.

4. A method as defined in claim 3 wherein the step of treating the surfactant treated soil with the alcohol includes the step of adding alcohol to the soil before, during or after the further treatment with the aliphatic or aromatic hydrocarbon.

5. A method as defined in claim 1 wherein the step of treating the soil with a chemical surfactant includes controlled treatment of the soil with natural oils and/or terpenes.

6. A method as defined in claim 5 wherein the controlled treatment is effective in degrading the bond between some of the organic contaminants and the soil.

7. A method as defined in claim 6 wherein the degradation of the bonds is effective in liberating the organic contaminants and solubilising aquaphobic organic contaminants.

8. A method as defined in claim 1 wherein the step of stockpiling the soil treated with the chemical surfactant involves stockpiling for a period of 1 day for gradual miscibilization of the organic contaminants.

9. A method as defined in claim 8 wherein the step of stockpiling includes the step of adding organic matter, manure, nutrients and/or soil ameliorants before or after treatment with the chemical surfactant.

10. A method as defined in claim 8 wherein the method further comprises the step of secondary stockpiling of the soil after the step of treating the soil with the chemical surfactant and the step of stockpiling the soil.

11. A method as defined in claim 10 wherein the step of secondary stockpiling includes a stockpiling period of several weeks to several months for gradual degradation of the organic contaminants liberated from the soil by the chemical surfactant.

12. A method as defined in claim 10 wherein the step of secondary stockpiling further includes the step of turning the stockpile approximately every 1 to 6 weeks for aeration and/or homogenization.

13. A method as defined in claim 12 wherein the step of turning the stockpile includes the step of adjusting nutrients and moisture levels for microbial growth.

14. A method as defined in claim 1 wherein the method further comprises the step of stockpiling the soil after the further treatment step with the aliphatic or aromatic hydrocarbon.

15. A method as defined in claim 14 wherein the step of stockpiling the soil after the further treatment step with the aliphatic or aromatic hydrocarbon occurs after resting the soil for a limited period following said further treatment.

16. A method as defined in claim 14 wherein the step of stockpiling the soil after the further treatment step with the aliphatic or aromatic hydrocarbon includes a stockpiling period of between 2 to 6 weeks for gradual degradation of the organic contaminants liberated from the soil by the surfactant and the aliphatic or aromatic hydrocarbon.

17. A method as defined in claim 15 wherein the step of stockpiling further comprises the step of turning the stockpile every 1 to 4 weeks for aeration and/or homogenization.

18. A method as defined in claim 17 wherein the step of turning the stockpile includes the step of adjusting nutrients and moisture levels for microbial growth.

19. A method as defined in claim 1 wherein the step of stockpiling the soil includes the step of separating the soil into two or more separate stockpiles.

* * * * *